United States Patent [19]
>
> Ueda et al.

[11] Patent Number: 4,472,619
[45] Date of Patent: Sep. 18, 1984

[54] METHOD OF WELDING FOR HARD SURFACING

[75] Inventors: Masato Ueda; Akira Notomi, both of Nagasaki, Japan

[73] Assignee: Mitxubishi Jukogyo Kabushiki Kaisha, Tokyo, Japan

[21] Appl. No.: 290,086

[22] Filed: Aug. 4, 1981

Related U.S. Application Data

[63] Continuation of Ser. No. 045,963, Jun. 6, 1979, abandoned.

[30] Foreign Application Priority Data

Jun. 26, 1978 [JP] Japan .................. 53-76419

[51] Int. Cl.³ .............................................. B23K 9/04
[52] U.S. Cl. ................... 219/76.15; 219/76.16
[58] Field of Search .............. 219/76.1, 76.14, 76.15, 219/77, 76.16

[56] References Cited

U.S. PATENT DOCUMENTS

| | | | |
|---|---|---|---|
| 2,841,687 | 7/1958 | Richter | 219/76.15 |
| 3,291,653 | 12/1966 | Eilers | 219/145.51 X |
| 4,097,711 | 6/1978 | Banerjee | 219/76.15 |

OTHER PUBLICATIONS

Cary, "Modern Welding Technology", Prentice Hall, Englewood Cliffs, N.J.; pp. 259-261, 1/9/1979.

*Primary Examiner*—Roy N. Envall, Jr.
*Assistant Examiner*—C. M. Sigda
*Attorney, Agent, or Firm*—Wyatt, Gerber, Shoup, Scobey and Badie

[57] ABSTRACT

A method of welding for hard surfacing comprises feeding a powdery mixture, prepared by adding at least one of the powders on NbC, VC, and TiC to the powder of an alloy steel containing either Fe, Ni, and Cr, or Fe and Cr as the chief components, to an arc produced between a base metal of iron or steel and a nonconsumable electrode shielded by an inert gas, and thereby forming a weld metal on the base metal.

5 Claims, 7 Drawing Figures

×100

×100

METHOD OF WELDING FOR HARD SURFACING

This is a continuation of application Ser. No. 045,963 filed June 6, 1979.

This invention relates to improvements in an arc welding method for hard surfacing and is directed to the provision of a method of forming a weld metal which is much harder than the welds conventionally made and has no possibility of weld crack.

Arc welding techniques commonly in use for hard surfacing consist of building up the weld metal by arc welding, with a welding rod of high carbon steel, high-chromium high carbon steel or carbon steel containing tungsten carbide (WC), on the work surface of a soft material having relatively good weldability.

It is sometimes the case with gas welding and tungsten inert-gas (TIG) arc welding that the soft iron or steel surface is padded with a welding rod composed mainly of Ni, Cr, B, and Si or of Cr, W, and Co.

Hard surfacing is, of course, intended for depositing filler metal of high hardness on the base metal. With an increase in the hardness, however, the weld metal formed by arc welding tends to crack.

FIG. 1 illustrates an example of an ordinary build-up welding generally known as TIG arc welding. In the diagrammatic representation, 1 is a base metal, 2 is a tungsten electrode for a TIG welding torch, 3 is a welding rod for hard surfacing, 4 is a shield gas nozzle of the welding torch, 21 is argon gas, and 7 is a DC arc welding power source for generating arcs with a load of arc voltage applied between the base metal 1 and the tungsten electrode 2.

The nozzle 4 is supplied with the shield gas 21 and an arc voltage from the source 7 is applied between the base metal 1 and the tungsten electrode 2 to produce a DC arc therebetween. As the hard-surfacing welding rod 3 is inserted into the arc, it is fused in the molten pool of the base metal 1 to form a weld 9 that serves the purpose of hard surfacing.

Generally, the welding rod materials to be employed in the TIG method for hard surfacing are Stellite composed chiefly of Co, W, Cr, and C and COLMONOY (trade name) of Ni, Cr, B, and Si.

Where Stellite with main ingredients of Co, W, Cr, and C is used as the welding rod 3 for hard surfacing in FIG. 1, the base metal 1 must be preheated. The preheating is to be followed by slow cooling in order to prevent weld crack due to extreme embrittlement with the formation of WC in the weld metal of Stellite. It is known from experience that the preheating temperature should be 600° C. where the base metal is common carbon steel or should be 700° C. for a low alloy steel such as 13Cr steel; otherwise, there will be a danger of cracking during the course of welding.

In spite of the preheating to such a high temperature and the subsequent slow cooling for many hours, the hardened surface layer is at most about $H_V$ 600 in hardness, and large workpieces make the welding operation extremely difficult.

Usually, alloys of Co, W, Cr, and C, which are not ductile enough to be fabricated into thin wires, are used in the form of round bars 3.2 mm or 6.0 mm in diameter. Consequently, TIG welding causes serious penetration of the base metal relative to the hard surfacing alloy, and the fusion of the alloy and base metal produces weld metal of a hardness far below the objective value.

Where great hardness is demanded of the weld for hard surfacing, it is necessary to increase the W and also C contents of the alloy. By way of example, the relations between the hardness of weld metal and the contents of C, W, Co, and Cr may be represented by the following table (in which the values are in percent by weight):

| Vickers hardness ($H_V$) | Fe | C | Co | W | Cr |
|---|---|---|---|---|---|
| 435 | 4 | 1.0 | 63 | 4.0 | 28.0 |
| 470 | 9.65 | 1.35 | 59 | 8.0 | 22.0 |
| 580 | 3.5 | 2.5 | 52 | 12.0 | 38.0 |

The alloy with increased W and C contents afford a weld metal as hard as $H_V$ 700. FIG. 2 is a photograph showing the microstructure of a weld of $H_V$ 700 formed by hard surfacing. The weld has a chemical composition as follows.

| Hardness | Chemical composition (wt %) | | | | |
|---|---|---|---|---|---|
| | C | Mn | Si | W | Fe |
| $H_V$ 700 | 2.8 | 1.7 | 0.5 | 56 | 39 |

From the chief ingredients of 2.8% C and 56% W as given in the above table, it is presumed that locally high $H_V$ values in the range of 800-1000 are attained. The method, however, produces weld cracks as indicated in another microstructural photograph in FIG. 3 and has very limited applications.

Hardnesses required of sliding parts of mechanical structures, rollers of rolling mills, tires, pump impellers, propellers for agitators, valve seats, gears, shafts, fan blades, and other parts for which wear resistance is essential are steadily increasing with improvements in performance of those machines and parts. The parts which had satisfactorily served the purposes till recently with the Vickers hardness in the range of 400-500 are now being supplanted with those in the range of 800-1000, for, otherwise, they would have quite short life in modern machinery. For this reason, the hard surfacing effect cannot be fully achieved today with such welds that crack with $H_V$ 700 as indicated in FIGS. 2 and 3.

The present invention is directed to the provision of a method of forming a weld metal which is harder than those made by ordinary arc welding for hard surfacing and which has no possibility of weld crack.

Stellite and COLMONOY are well-known hard surfacing materials excellent in resistance to heat, corrosion, and wear. Stellite, commonly known as a Co-base alloy, contains C in addition to Co, Cr, W, and Fe. It forms a weld metal hardened with WC, the maximum hardness attainable today being up to 64 on Rockwell C scale ($H_{RC}$) or Vickers hardness ($H_V$) 800. If a weld that achieves the purpose of hard surfacing with this high hardness is to be obtained, the base metal must be preheated to 600°-700° C., for example, when it is a carbon steel. Moreover, heat treatment and slow cooling over long periods of time are important to avoid cracking of the hardened surface layer.

We found it necessary to develop a welding method for surface hardening whereby a hardened layer free of cracking, highly machinable, and outstandingly hard can be obtained, in order to improve the wear resistance of such machines and parts as the exhaust valves of Diesel engines, internal mixers for rubber plants, main stop valves of steam turbines, cement mixers, and dredger buckets. With these in view, we made research on "a method of plasma arc padding with superhard materials", which has led to the perfection of this invention.

The invention resides, in essence, in a welding method for hard surfacing which comprises feeding a powdery mixture, prepared by adding at least one of NbC, VC, and TiC powders to the powder of an alloy steel containing either Fe, Ni, and Cr, or Fe and Cr as the chief components, to an arc produced between a base metal of iron or steel and a nonconsumable electrode shielded by an inert gas, and thereby forming a weld metal on the base metal.

To be more concrete, the invention includes the following embodiments:

(1) A procedure in which the powder of an alloy steel composed essentially of either Fe, Ni, and Cr, or Fe and Cr is mixed with at least one of the powders of NbC, VC, and TiC, and this powdery mixture is fed to an arc generated by a nonconsumable electrode in a shield of an inert gas to form a weld metal of Fe-Ni-Cr-NbC, Fe-Cr-NbC, Fe-Ni-Cr-VC, Fe-Cr-VC, Fe-Ni-Cr-TiC, Fe-Cr-TiC or a mixture of such alloys on the base metal surface of iron or steel.

(2) A procedure in which the powder of an alloy steel composed essentially of either Fe, Ni, and Cr, or Fe and Cr is mixed with at least one of the powders of NbC, VC, and TiC, and this powdery mixture is fed to a plasma arc to form a weld metal of Fe-Ni-Cr-NbC, Fe-Cr-NbC, Fe-Ni-Cr-VC, Fe-Cr-VC, Fe-Ni-Cr-TiC, Fe-Cr-TiC or a mixture of such alloys on the base metal surface of iron or steel.

The present invention is applicable to the welding for hard surfacing of all metallic articles for which wear resistance is essential and also of the parts required to be resistant to both corrosion and abrasion, such as the component members of rolling stocks, construction equipment, power plants, industrial machinery, and prime movers.

The alloy steels containing Fe, Ni, and Cr as the chief components and useful in practice of the invention include the following:

Martensitic stainless steels
　13Cr-2Ni
　13Cr-6Ni
Austenitic stainless steels
　18Cr-8-Ni
　18Cr-8Ni-Mo
　18Cr-12Ni-Mo
　18Cr-12Ni-Mo-Cu
　18Cr-12Ni-Nb
　22Cr-12Ni
　22Cr-12Ni-Mo
　25Cr-20Ni
Precipitation-hardened stainless steels
　17Cr-4Ni
　15Cr-5Ni Also, examples of useful alloy steels containing Fe and Cr as the main components are as follows:
Ferritic stainless steels
　13Cr
　13Cr-Al
　11Cr-Ti
　15Cr
　17Cr
　17-Cr-Mo
　17Cr-Mo-Cu
　17Cr-Nb
　21Cr
　21Cr-Cu The quantity of NbC, VC, and/or TiC powder to be mixed in the alloy steel powder ranges from 35 to 85% (by volume) on the basis of the volume of the latter. Where two or three carbides of NbC, TiC, and/or VC are to be mixed for use, the mixing ratio should come within the hatched zone in FIG. 7.

Examples of the invention will now be described in detail with reference to the accompanying drawings, in which.

Figure 1:
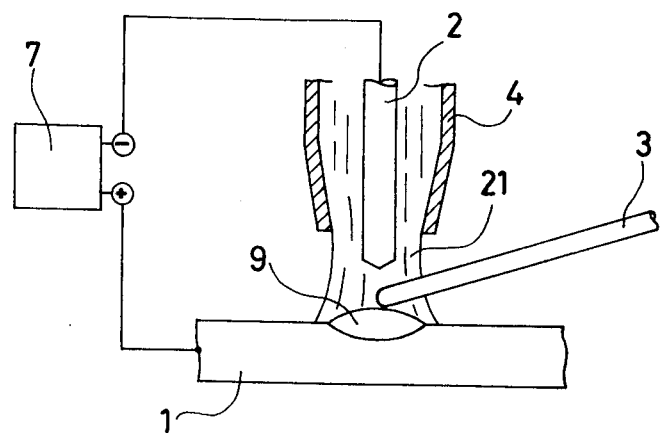
FIG. 1 is a schematic diagram of arrangements for a conventional welding method for hard surfacing.
Figure 4:
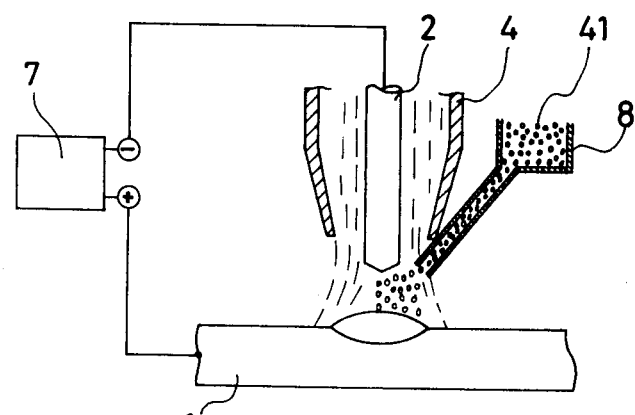
FIGS. 4 and 5 are schematic diagrams of arrangements for embodying the method of the invention.

Referring to FIG. 4, which illustrates the method of the invention, the welding rod 3 used in FIG. 1 is replaced by a mixture of an alloy steel powder and a metal carbide powder, which is fed into a TIG arc to carry out welding for hard surfacing.

In the figure, 1 is carbon steel as the base metal to be welded, 2 is a tungsten electrode, 4 is a shield gas nozzle, 7 is a DC arc welding power source, 8 is a powder hopper, and 41 is a powdery mixture of 80 vol% of a low carbon alloy steel consisting of 10% Ni, 19% Cr, and balance Fe and 20 vol% of VC powder, all pulverized to about 200 mesh in particle size.

While the shield gas nozzle 4 is being supplied with argon gas at a rate of 10 l/min, the electric circuit of the DC arc welding power source 7 is closed. This produces a DC arc between the base metal of carbon steel and the tungsten electrode 2. With welding current of about 150 A, the arc voltage is kept at 15 V and the powder is allowed to flow at a rate of 20 g/min while argon gas is being supplied to the powder hopper 8. The powder melts as it passes through the arc and forms a weld metal on the work surface of carbon steel 1.

While the weld metal thus obtained has a Vickers hardness in the range of 900–1000, there is no crack in the weld zone nor any penetration of the base metal. Further, preheating of the carbon steel as the base metal is not in the least necessary, and the hard-surfacing welding is possible at a room temperature of only 10° C. to give a hardened layer of superior quality.

Figure 5:
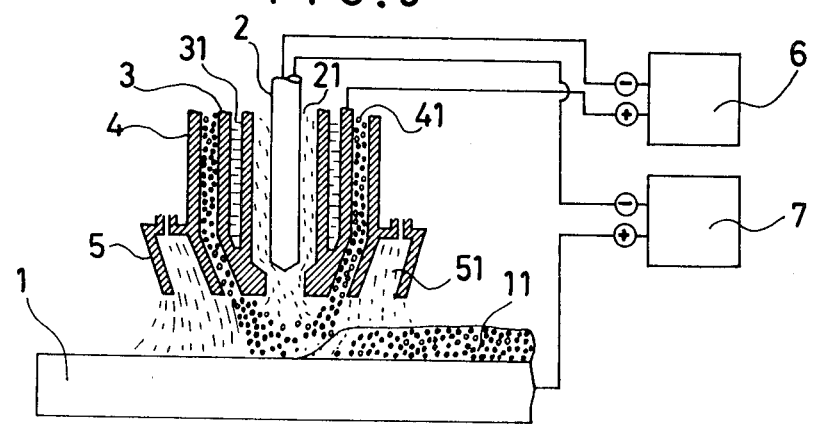
Figure 2:
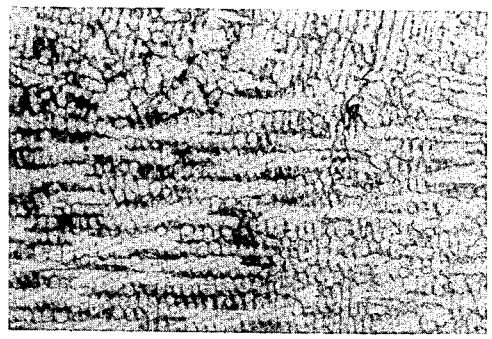
FIGS. 2 and 3 are photographs showing the microstructures of welds formed by conventional hard surfacing techniques.
Figure 3:
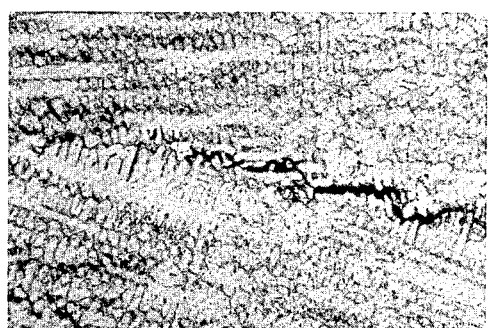

FIG. 5 illustrates another example of the invention, in which a mixture of a low-carbon alloy steel powder and a metal carbide powder is fed to a plasma arc to effect hard surfacing.

According to conventional methods, the hard surfacing operation is carried out by supplying the powder of Stellite or COLMONOY into the plasma arc. The work surface so hardened has a Vickers hardness of 700 and frequently cracks. The weldability is very poor with the necessity of preheating at elevated temperature and subsequent slow cooling.

In FIG. 5, 1 is a carbon steel plate to be welded, 2 is a tungsten electrode of a plasma arc welding torch, 3 is a copper electrode of a jacket structure to be cooled by cooling water 31, and 4 is an outer cylinder surrounding the copper electrode 3 and providing a space to receive a powdery material 41 therebetween. The material 41 is a mixture of 80% by volume of an austenitic stainless steel powder, grade SUS 304L (10% Ni, 20% Cr, and bal. Fe) and 20% by volume of an NbC powder, both pulverized to fine particles of 200 mesh. The numeral 5 indicates a shield gas nozzle to provide a shielding around the plasma arc, and 51 indicates argon gas.

A high speed jet of argon gas, designated 21, is supplied around the tungsten electrode to form the plasma arc.

The numeral 6 indicates a DC power source for producing a pilot arc between the tungsten electrode 2 and the copper electrode 3, and 7 indicates a DC arc-welding power source for producing the plasma arc between the tungsten electrode 2 and the carbon steel plate 1. As soon as the circuit for the DC source 6 is closed after the supply of argon gas 21, a pilot arc is carried between the tips of the tungsten and the copper electrodes 2, 3. Next, while the shield gas 51 is being supplied, the circuit of the DC arc-welding power source 7 is closed, when a plasma arc is drawn between the tungsten electrode 2 and the work 1.

Figure 6:
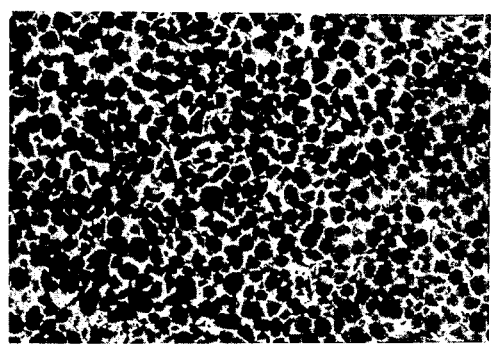
FIG. 6 is a photograph showing the microstructure of a cross section of a weld metal formed in accordance with the method of the invention.
Figure 7:
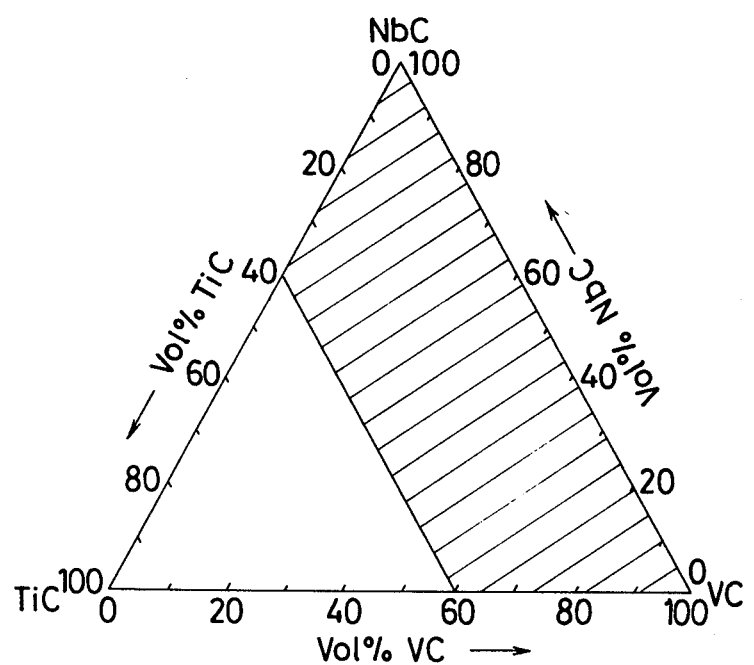
FIG. 7 is a chart illustrating the compounding proportions of NbC, VC, and TiC powders to be used in a mixture according to the invention.

With a plasma arc voltage of 27 V and a plasma current of 130 A, the powder 41 is issued at a rate of 10 g/min. The powder melts in the plasma arc and forms a weld metal 11 on the surface of the carbon steel 1. The microstructure of a cross section of this weld metal is photographed in FIG. 6. The Vickers hardness of this portion is 1000, and the weld surface is smooth and crackless. In this example, too, the base metal need not be preheated and there is no danger of weld crack.

In the third example, exactly the same welding conditions as in the preceding example were used except that the alloy steel powder was of a composition of 12% Cr, 87% Fe, and 0.2% Al. 40% by volume of this alloy steel powder was mixed with 30% by volume each of VC and NbC powders, and the whole mixture was supplied to a plasma arc to form a weld metal on the surface of carbon steel. As a result, a hard-surfacing weld zone was formed with a maximum hardness of H$_V$ 850, or such a hardness that has not hitherto been obtained without cracking.

Further, the same alloy steel powder of 12% Cr, 87% Fe, and 0.2% Al and the same welding conditions as above were employed. A powdery mixture of 40% by volume of the alloy steel powder and 30% by volume each of TiC and NbC powders was supplied to a plasma arc, and a weld metal was formed on the surface of carbon steel. With a maximum hardness of H$_V$ 850, a surface-hardening weld zone of the high hardness never attained heretofore without cracking was produced.

In brief, the present invention resides in a method which comprises feeding a powdery mixture, prepared by adding at least one of NbC, VC, and TiC powders to the powder of an alloy steel containing either Fe, Ni, and Cr, or Fe and Cr as the chief components, to an arc produced between a base metal of iron or steel and a nonconsumable electrode shielded by an inert gas, and thereby forming a weld metal on the base metal. According to this invention, welding for hard surfacing can be performed to a very high hardness without materially melting the base metal and in a crackless way.

What is claimed is:

1. A method of welding for hard surfacing a base metal of iron or steel without preheating the base metal which comprises feeding a powdery mixture, prepared by adding at least one powder selected from the group consisting of NbC, VC, and TiC powders to the powder of an alloy steel containing either Fe, Ni and Cr or Fe and Cr as the chief components, to an arc produced between said base metal and a nonconsumable electrode shielded by an inert gas, and thereby forming a weld metal on a base metal.

2. A method according to claim 1, wherein said alloy steel containing Fe, Ni, and Cr as the chief components is at least one steel selected from the group consisting of 13Cr-2Ni and 13Cr-6Ni martensitic stainless steels, 18Cr-8Ni, 18Cr-8Ni-Mo, 18Cr-12Ni-Mo, 18Cr-12Ni-Mo-Cu, 18Cr-12Ni-Nb, 22Cr-12Ni, 22Cr-12Ni-Mo, and 25Cr-20Ni austenitic stainless steels, and 17Cr-4Ni and 15Cr-5Ni precipitation-hardened stainless steels.

3. A method according to claim 1, wherein said alloy steel containing Fe and Cr as the chief components is at least one steel selected from the group consisting of 13Cr, 13Cr-Al, 11Cr-Ti, 15Cr, 17Cr, 17Cr-Mo, 17Cr-Mo-Cu, 17Cr-Nb, 21Cr, and 21Cr-Cu ferritic stainless steels.

4. A method according to claim 1, wherein said powdery mixture consists of from 65 to 15% by volume of said alloy steel powder and from 35 to 85% by volume of at least one power selected from the group of NbC, VC, and TiC powders.

5. A method according to claim 1, wherein said powdery mixture is fed to a plasma arc shielded by an inert gas.

* * * * *